April 7, 1953 G. M. HILL 2,634,401
ALTERNATE LINE CIRCUITS FOR COMMUNICATION SYSTEMS
Filed Jan. 26, 1952
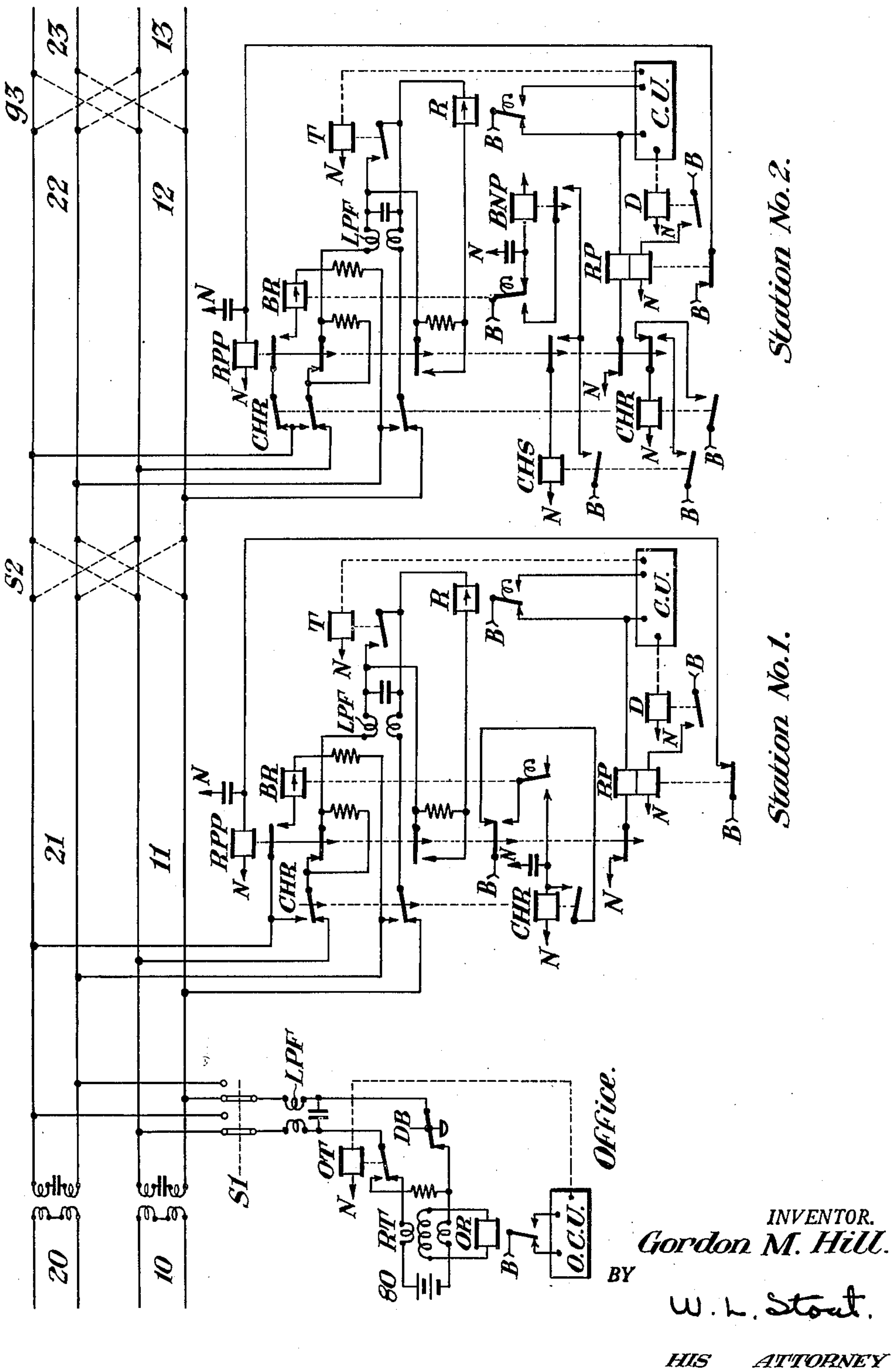
INVENTOR.
Gordon M. Hill.
BY
W. L. Stout.
HIS ATTORNEY Patented Apr. 7, 1953 2,634,401

UNITED STATES PATENT OFFICE 2,634,401

ALTERNATE LINE CIRCUITS FOR COMMUNICATION SYSTEMS

Gordon M. Hill, Mobridge, S. Dak., assignor to Westinghouse Air Brake Company, Wilmerding, Pa., a corporation of Pennsylvania Application January 26, 1952, Serial No. 268,413

9 Claims. (Cl. 340—147)

My invention relates to line circuits for communication systems of the code type, and in particular to line circuits for centralized traffic control systems for railroads or the like where the maintenance of continuity of service is highly important.

The principal object of my invention is the provision of line change-over means for a code type communication system by which the system may be promptly restored to operation in the event of a fault in the line circuit normally used. This is accomplished in accordance with my invention by transferring the circuit from the pair of line wires normally used, throughout all or a portion of its length, to a second pair of line wires known to be in working order.

More particularly, the object of my invention is the provision of means for transferring one or more designated stations of a centralized traffic control system from the line wires to which they are normally connected to a second pair of line wires by remote control, under the direction of the dispatcher or central office operator.

Upon the occurrence of a fault in a section of line between two points where local operators are stationed, the usual procedure is for the dispatcher to request them to transfer the code line to a second designated pair of wires at the near end of the section, and back to the pair normally used at the remote end so as to restore communication between the office and the stations of the centralized traffic control system located beyond the defective section. However, the field stations within that section cannot be conveniently switched to the second line by these operators because these stations are generally located at points not readily accessible to them.

A number of schemes are already known for transferring a code communication circuit from one pair of line wires to another, such as for example, those shown in Letters Patent of the United States No. 2,059,204 of Boswau, and No. 2,459,454 of Brixner et al. In the prior systems, the spare line has a transfer relay normally connected thereto, the energization of which by remote control serves to transfer the code communication system from the line it is using and to connect it to the spare line. It follows that the spare line cannot be used normally for any purpose involving the supply of energy thereto sufficient to operate the transfer relay.

A further object of my invention is to overcome these disadvantages and to provide an arrangement whereby the code communication system is rendered wholly independent of the condition of energization of any other line circuit as long as its normal line circuit is in working order, enabling the line designated as the spare line to be used normally for any purpose desired.

Usually there are two telephone lines extending the length of a centralized traffic control installation, one being a dispatcher's line equipped with a code system for calling selected stations where operators are stationed, the other being a block line having a telephone at each field station of the centralized traffic control system for enabling the crew of a train stopped at a signal to call the dispatcher for orders.

The change-over system of my invention enables either of these lines to be used for the normal line circuit, the other for the spare line circuit for the centralized traffic control system, either in its entirety or between any two points where it may be convenient to interchange the connections to the two lines.

One form of apparatus embodying my invention and one modification thereof will now be described in connection with the accompanying drawing, and the novel features thereof will then be pointed out in claims.

Referring to the drawing, the reference characters 10 through 13 and 20 through 23 designates sections of two telephone lines which extend between points where manual supervision is available, and which correspond to the block telephone and dispatcher's telephone lines above referred to. Sections 11, 12 and 13 of the block telephone line have the line circuit of a centralized traffic control system superimposed thereon through low pass filters LPF. This line circuit is normally supplied with direct current from a source 30 at the control office by which line relays R, connected in multiple across the line wires at the several field stations, are maintained normally energized.

In the drawing the reference characters B and N designate the positive and negative terminals of the local sources of current for energizing the various relays.

The centralized traffic control system as shown corresponds to that shown in Letters Patent of the United States No. 2,411,375, issued November 19, 1946 to Arthur P. Jackel, for Remote Control Systems.

Only those portions of the line circuit and apparatus of this remote control system which have a bearing on the present invention are shown herein, and reference may be made to the patent for a detailed description of its construction and mode of operation. In brief, this system comprises a coding unit O. C. U. at the office governed by a line relay OR and a coding unit C. U. at each field station, of which two are shown herein, governed by the associated line relay R. Control codes are transmitted by a transmitter relay R which operates the line relays R in accordance with the different codes by opening and closing the line for selected long and short periods each of which constitutes a code element.

Each code transmitted from the office for control purposes comprises two groups of elements, the first constituting a station code call, which operates a delivery relay D at the station selected. Relay D when operated conditions the station to receive the second group of elements constituting the control elements of the code.

The office transmitter is also adapted to transmit a recall code which includes only the first group of elements referred to and terminates with the operation of relay D at the selected station.

Optionally, a "general recall" code may be transmitted, comprising selecting elements of such a character as to operate the relays D at all stations.

The coding unit at each station is provided with a transmitter relay T which when initiated transmits indication codes to the office. Each indication code is identified by a first group of elements which constitute the station's code call and includes a second group of elements which indicates the condition of the controlled devices at the station from which the code is transmitted.

The operation of the delivery relay D at a station, by a control code or recall code, initiates the transmission of an indication code from that station. This enables the operator to verify the condition of the controlled devices at any station, and is useful in connection with the present invention because it enables the operator to quickly verify the restoration to service of any station following an interruption of service due to a line fault.

The indication codes are transmitted by the station transmitter relay T, which varies the line current supplied by battery 80 by periodically shunting the line, and thereby operating the office line relay OR which is connected to the line through an impulse transformer T. The indication system has been shown only in part herein, in diagrammatic form, in order to simplify the drawing.

The apparatus at each station also includes a slow release "line disconnect" or fault relay RPP, which is maintained normally energized by a stick repeater relay RP of the line relay R, as described in the Jackel patent, and more particularly in Letters Patent of the United States No. 2,376,569, granted to George W. Baughman on May 22, 1945, for Remote Control Systems, where this feature is disclosed and claimed.

Relay RPP is provided primarily to enable the central office operator to isolate the code transmitter at any station of the system by remote control, in the event it becomes defective in such a way as to interfere with the operation of the remainder of the system. As disclosed herein, relay RPP is utilized also for the control of the line change-over apparatus of my invention.

Relay RPP is provided with a condenser snubbing circuit which causes it to have a release period of about five seconds, so that it remains in its energized position unless relays R and RP remain released for a period longer than occurs in normal operation. Relay RPP releases in the event of a line fault, and also may be released by the operator, by pressing a disconnect button DB, and the opening of a contact of relay RPP in the circuit for relay RP maintains these relays released following the reenergization of relay R. The release of relay RPP isolates the station transmitter from the line in the manner explained in the patents referred to, but does not interfere with the reception of a code by the station coding unit by which relay D is operated.

Relay RPP is reenergized to restore the station coding unit to service by the transmission of a recall code to operate relay D which will energize relay RP over its lower winding. Relay RP in turn energizes relay RPP, which completes the circuit for relay RP which includes the left-hand contact of relay R. The restoration of the station to service is indicated to the operator by the reception of an indication code from this station.

The apparatus at each station which is added for the purposes of the present invention in its basic form is arranged as shown for station No. 1. This comprises a line relay BR which is connected to the line wires of the second or spare line circuit whenever the associated fault relay RPP releases, and a change-over relay CHR which serves to transfer relay R to the spare line circuit whenever relay BR becomes energized.

The apparatus at station No. 2 comprises a modification which functions in a slightly different manner, but which may be provided at each station in place of that shown for station No. 1, for the same purpose.

Considering first the operation of the apparatus at station No. 1, it will be seen that in the event of a line fault, relay RPP releases and connects relay BR across the line wires 21 of the spare line. The line circuit for the centralized traffic control circuit may then be transferred to the spare line section 21 by operation of a switch S1, whereupon relay BR is energized by current supplied by battery 80, and then the change-over relay CHR is energized over the left-hand contact of relay BR and a back contact of relay RPP, and transfers relay R from line 11 to line 21 so that relay R becomes energized in multiple with relay BR. The central office may now send a recall code to station No. 1 to pick up, in turn, relays D, RP, and RPP. Relay BR becomes disconnected from the line and releases when relay RPP picks up, but relay CHR is held energized over a stick circuit including a front contact of relay RPP, and consequently relay R remains connected to the spare line.

By manual switching at points S2 and S3 line wires 11 or 21 may be connected to wires 22 or 12, and the latter to wires 13 or 23 as indicated by dotted lines, so as to connect the line relays at stations in the different line station to either pair as may be desired. Irrespective of which line the stations are connected to, they may be restored to service by the transmission of recall codes as already described.

Assuming that both lines are in working order, it will be seen that relay RPP at station No. 1 may be released at the will of the operator and that this places the equipment in such condition that it may be restored to service over either line as may be desired.

It will also be noted that the transfer of the station to the line designated as the spare line results temporarily in an abnormal load on this line because both relays R and BR are supplied with current at each station from the time relay CHR picks up until the station is restored to service by the energization of relay RPP. The spare line may be a dispatcher's telephone line already heavily loaded by numerous call selectors bridge across the line and if the number of stations of the centralized traffic control system is large, the battery voltage necessary for operation may become undesirably high.

The modification of the invention illustrated by the apparatus at station No. 2 has for its object the overcoming of this disadvantage, by arranging the circuits so that only one line relay is connected to the spare line at any one time.

The apparatus required for the modified form of the invention comprises a line relay BR and a change-over relay CHR as already described, and in addition, a change-over storage relay CHS, and a slow release relay BNP energized over a normally closed contact of relay BR.

The modified form of the invention operates in the following manner:

In the event of a fault in line 12, relay RPP releases and connects relay BR across the spare line 22, and in addition prepares pickup circuits for relays CHS and CHR. Relay BNP has slow release characteristics similar to those of relay RPP, and renders the operation of relay BR ineffective unless relay BR remains steadily energized. When the operator connects battery 80 to lines 21 and 22, relay BR becomes energized long enough to release relay BNP. Relay CHS then becomes energized and in turn energizes relay CHR. In this form of the invention, relay CHR, when energized, disconnects relay BR from the spare line in addition to transferring relay R from the normal line to the spare line. After relay BR releases, relay CHS is held energized over a stick circuit and so holds relay CHR energized.

The purpose of relay BNP is to prevent the operation of relay CHS due to the temporary energization of relay BR as would occur, for example, as the result of the transmisison of a selector code over line 22, for telephone call purposes. It is to be understood that the selector system contemplated is of a type such as the one disclosed in Letters Patent of the United States No. 1,343,256, granted June 15, 1920, to J. C. Field, in which energy is supplied to the line only during the transmission of a code.

Station No. 2 may be restored to service in the usual manner by the transmission of a recall code, for reenergizing relay RPP. When relay RPP becomes energized, relay CHS releases. The change-over relay CHR is then held energized over a front contact of relay RPP in the same way as at station No. 1.

Although I have herein shown and described but one form of my invention and one modification thereof, it will be understood that various changes and modifications may be made therein within the scope of the appended claims without departing from the spirit and scope of my invention.

Having thus described my invention, what I claim is:

1. Line change-over apparatus for a code type communication system having a normally closed line circuit comprising a pair of line wires extending from a control office to a remote station to which a source of current is connected over a transmitting contact at said office and across which the winding of a line relay is connected at said station, said system also having a delivery relay controlled by said line relay which is selectively responsive to a code transmitted by said contact, and a slow release fault relay which becomes energized when the delivery relay is operated and is released when the line relay is denergized due to a line fault, said change-over apparatus comprising a change-over relay effective when energized to transfer the connection of said line relay to a second pair of line wires to which said source of current and transmitting contact may be manually connected, a second line relay which becomes connected across said second pair of line wires when said fault relay releases, a pickup circuit for said change-over relay closed by said second line relay when current is supplied thereto over said second pair of line wires, and a stick circuit for said change-over relay including its own front contact and a contact closed when said fault relay is energized.

2. In a code type communication system having a normally closed line circuit extending from a control office to a remote station which normally includes a first pair of line wires and alternatively includes a second pair of line wires, a change-over relay, a line relay at said station connected alternatively across said first pair of line wires over back contacts or to said second pair of line wires over front contacts of said change-over relay, a source of current at said office, manually operable switching means for alternatively connecting said source to said first or second pair of line wires to energize said line relay, a slow acting fault relay arranged to be picked up by operation of said line relay and to release when said line relay is deenergized for a predetermined time interval, a second line relay controllable over said second line circuit only when said fault relay is released, a pickup circuit for said change-over relay including a front contact of said second line relay, and a stick circuit for said change-over relay including its own front contact and a front contact of said fault relay.

3. In a code type communication system having a line relay at a remote station controllable from a central office alternatively over a first or a second pair of line wires, a fault relay arranged to assume its energized position in response to the code operation of said line relay and to remain energized only as long as said relay continues to be supplied with steady or coded current, a change-over relay the contacts of which in a first position connect the line relay to the first pair of line wires and in a second position connect the line relay to the second pair of line wires, a second line relay remotely controllable over said second pair of line wires only when said fault relay is released, a circuit closed when the fault relay is released and the second line relay is energized for operating the change-over relay to its second position, and a second circuit controllable by said fault relay to cause said change-over relay to assume its first position.

4. In a code type communication system, a code responsive line relay, a change-over relay the contacts of which in a first position connect said line relay to a first pair of line wires and in a second position connect the line relay to a second pair of line wires, a second line relay controllable over said second pair of line wires for operating said change-over relay from its first to its second position, and means for preventing the operation of said second line relay by current supplied to the second pair of line wires as long as current continues to be supplied to said code responsive line relay over said first pair of line wires.

5. In a code type communication system, a normally energized line relay, a fault relay which picks up in response to the code operation of said line relay and releases when said line relay remains released for an abnormal time interval, a change-over relay the contacts of which in a first position connect said line relay to a first pair of line wires and in a second position connect said line relay to a second pair of line wires, a second line relay controllable only over said second pair of line wires for operating said change-over relay to its second position, and means for preventing the operation of said second line relay except when said fault relay is released.

6. In a code type communication system, a normally energized line relay, a fault relay which picks up in response to the code operation of said line relay and releases when said line relay remains released for an abnormal time interval, a change-over relay the contacts of which in a first position connect said line relay to a first pair of line wires and in a second position connect said line relay to a second pair of line wires, a second line relay controllable only over said second pair of line wires for operating said change-over relay to its second position, and means effective if said fault relay picks up in response to a code supplied to said second line circuit when the change-over relay is in its second position for disconnecting the second line relay from said second line circuit.

7. In a code type communication system, an office and a station connected by two pairs of line wires, a first line relay at said station, a change-over relay the contacts of which in a first position connect the line relay to one pair and in a second position to the other pair of line wires, a second line relay controllable over said second pair of line wires for operating said change-over relay to its second position, means at said office for supplying energy alternatively to said first pair of line wires or to said second pair of line wires, and means controlled by said first line relay and effective as long as said relay continues to be supplied with energy over said first pair of line wires for preventing the operation of said second line relay by energy supplied to said second pair of line wires.

8. In a code type communication system, an office and a station connected by two pairs of line wires, a first line relay at said station, a change-over relay the contacts of which in a first position connect the line relay to one pair and in a second position to the other pair of line wires, a second line relay controllable over said second pair of line wires for operating said change-over relay to its second position, means at said office for supplying energy alternatively to said first pair of line wires or to said second pair of line wires, and means controlled by said first line relay and effective as long as said relay continues to be supplied with energy over said first pair of line wires for disconnecting said second line relay from said second pair of line wires.

9. In a code type communication system, an office and a station connected by two pairs of line wires, a line relay at the station, means at the office for supplying energy to said line wires, a change-over relay the contacts of which in a first position connect the line relay to one pair and in a second position to the other pair of line wires, means controllable by energy supplied over the second pair of line wires for operating said change-over relay to its second position, and a fault relay controlled by said line relay effective as long as energy continues to be supplied to said line relay over said first pair of line wires for preventing the operation of said change-over relay by energy supplied over said second pair of line wires.

GORDON M. HILL.

REFERENCES CITED

The following references are of record in the file of this patent:

UNITED STATES PATENTS

| Number | Name | Date |
|---|---|---|
| 2,135,295 | Stewart | Nov. 1, 1938 |
| 2,171,751 | Jackel | Sept. 5, 1939 |
| 2,280,009 | Rosensteel | Apr. 14, 1942 |